(12) United States Patent
Huang et al.

(10) Patent No.: US 7,173,755 B2
(45) Date of Patent: Feb. 6, 2007

(54) HIGH-EFFICIENCY MULTIPLE-PASS NONLINEAR OPTICAL WAVELENGTH CONVERTER WITH AN ELECTRO-OPTIC PHASE COMPENSATOR AND AMPLITUDE MODULATOR

(75) Inventors: Yen-Chien Huang, Yonghe (TW);
Yen-Hung Chen, Dali (TW);
An-Chung Chiang, Jhongli (TW);
Ko-Wei Chang, Bali Township, Taipei County (TW)

(73) Assignee: National Tsing Hua University, Hsinchu (TW)

( * ) Notice: Subject to any disclaimer, the term of this patent is extended or adjusted under 35 U.S.C. 154(b) by 105 days.

(21) Appl. No.: 11/018,115

(22) Filed: Dec. 20, 2004

(65) Prior Publication Data
US 2005/0134958 A1    Jun. 23, 2005

(30) Foreign Application Priority Data
Dec. 23, 2003    (TW) .............................. 92136644 A

(51) Int. Cl.
*G02F 1/365*    (2006.01)
*G02F 1/377*    (2006.01)
*G02F 1/39*    (2006.01)

(52) U.S. Cl. ...................... 359/332; 359/326; 359/328; 359/330

(58) Field of Classification Search ......... 359/326–332
See application file for complete search history.

(56) References Cited

U.S. PATENT DOCUMENTS
2003/0112492 A1*    6/2003    Huang ........................ 359/321

OTHER PUBLICATIONS

Myers et al., Quasi-phasw-matched 1.064-μm-pumped optical parametric oscillator in bulk periodically poled LiNbO$_3$, Optics Letters, Jan. 1, 1995, vol. 20, No. 1, pp. 52-54.
T.H. Jeys, Multipass optical parametric amplifier, Optics Letters, Aug. 15, 1996, vol. 21, No. 16, pp. 1229-1231.
Imeshev et al., Phase correction in double-pass quasi-phase-matched second-harmonic generation with a wedged crystal, Optics Letters, Feb. 1, 1998, vol. 23, No. 3, pp. 165-167.

* cited by examiner

*Primary Examiner*—John D. Lee
(74) *Attorney, Agent, or Firm*—Volpe and Koenig, P.C.

(57) ABSTRACT

A high-efficiency multiple-pass nonlinear wavelength converter and amplitude modulator employs a variable dispersion element between adjacent passes of a nonlinear wavelength conversion process in a single nonlinear optical material substrate. When controlled by a voltage via the electro-optic effect, the variable dispersion element dynamically alters the phase matching condition of the multiple-pass nonlinear wavelength conversion process and thus modulates the laser output amplitude. When the phase mismatch between passes is completely compensated by the variable dispersion element, the multiple-pass nonlinear wavelength converter achieves its maximum efficiency.

30 Claims, 14 Drawing Sheets

HIGH-EFFICIENCY MULTIPLE-PASS NONLINEAR OPTICAL WAVELENGTH CONVERTER WITH AN ELECTRO-OPTIC PHASE COMPENSATOR AND AMPLITUDE MODULATOR

FIELD OF THE INVENTION

The present invention is related to an optical-wave processor for simultaneously performing high-efficiency multiple-pass wavelength conversion and effective amplitude modulation of optical waves in a nonlinear optical material. An electro-optic phase tuner monolithically integrated with a nonlinear crystal section is used for correcting phase mismatch in nonlinear wavelength conversion between successive passes and for modulating the output amplitudes of the mixing waves.

BACKGROUND OF THE INVENTION

Nonlinear wavelength conversion, producing tunable laser wavelengths, is very useful in a wide range of applications. It is always desirable to have high efficiency for nonlinear wavelength conversion. The power conversion efficiency of the nonlinear optical process strongly depends on the length of the crystal, the pump power, and the nonlinear coupling coefficient. To maximize the effective nonlinear coefficient in a nonlinear wavelength conversion process, L. E. Myers et al. has disclosed a kind of quasi-phase-matched nonlinear crystal, called periodically poled lithium niobate, in Quasi-phase-matched 1.064-µm Pumped Optical Parametric Oscillator in Bulk Periodically Poled $LiNbO_3$ in Opt. Lett. Vol. 20 pp. 52–54 (1995). When the pump power is low and the nonlinear coefficient is fixed, the length of a nonlinear optical crystal often limits power efficiency in nonlinear wavelength conversion. In the low-efficiency regime, power efficiency in a nonlinear optical waveguide is proportional to the square of the crystal length, whereas that in a bulk nonlinear optical crystal is linearly proportional to the crystal length due to diffraction. In the high-efficiency regime, power gain for parametric amplification can grow exponentially along the crystal length. Most nonlinear optical crystals are expensive and not easy to grow, and therefore typical nonlinear crystals have a size varying from a few millimeters to a few centimeters. Although it is possible to access a longer effective gain length by traversing optical waves several times in a nonlinear optical material via internal or external reflections, the phase matching condition for nonlinear wavelength conversion is often destroyed upon reflection. To increase the gain length in a nonlinear crystal of a finite size, T. H. Jeys disclosed a multiple-pass optical parametric amplifier in Opt. Lett. Vol. 21, pp. 1229–1231 (1996). However, Jeys's device has no phase correction between passes and is only applicable to broadband optical parametrical generation from vacuum noises. A double-pass second-harmonic generation with mechanical phase correction was disclosed by G. Imeshev et al. in Phase Correction in Double-pass Quasi-phase-matched Second-harmonic Generation with a Wedged Crystal, Opt. Lett. Vol. 23, pp. 165–167 (1998). However, mechanical phase correction is unstable and slow.

It is therefore attempted by the applicants to deal with the above difficulties encountered in a multiple-pass nonlinear wavelength conversion process. It is known in the field that the much faster and more stable electro-optic effect can alter the refractive index of and the phase of an optical wave in a second-order nonlinear optical material. The present invention employs an electro-optic phase compensator properly integrated to a multiple-pass nonlinear wavelength converter to achieve high-efficiency nonlinear wavelength conversion. On the other hand, signal modulation is often necessary for sensitive detection and information transmission in various laser applications. It is desirable to have a high-efficiency nonlinear frequency converter with a built-in convenient modulator. The present invention has the additional advantage of using the high-speed electro-optic phase compensator to function as a high-speed amplitude modulator to the nonlinear mixing waves.

SUMMARY OF THE INVENTION

It is therefore an object of the present invention to propose an optical processor for simultaneously performing multiple-pass wavelength conversion and amplitude modulation of optical waves by using an electro-optic (EO) method to compensate and control the phase mismatch upon wave reflection in a nonlinear optical material.

It is an aspect of the present invention to propose an optical processor for simultaneously performing multiple-pass wavelength conversion and amplitude modulation of optical waves in a crystal substrate comprising a phase-matched nonlinear element section and a variable dispersion section.

Preferably, the crystal substrate, the variable dispersion section, and the phase-matched element section are integrated monolithically in a nonlinear optical material.

Preferably, the phase-matched nonlinear element section is a quasi-phase-matched (QPM) crystal section.

Preferably, the QPM crystal section is applicable for second-order nonlinear wavelength-conversion processes of second harmonic generation (SHG), sum frequency generation (SFG), difference frequency generation (DFG), and optical parametric generation (OPG).

Preferably, the optical path of the variable dispersion section varies in the direction perpendicular to the propagation direction of the mixing waves in order to spatially modulate the phase matching condition of the mixing waves.

Preferably, the said crystal substrate has a plurality of adequate reflection edges in order to reflect the nonlinear interacting waves along an optical path in the nonlinear crystal at least two times longer than otherwise a single-pass path without the adequate reflecting edges.

Preferably, the variable dispersion section has a plurality of conducting electrodes.

Preferably, the conducting electrodes are applied with a suitable DC voltage, and the variable dispersion section functions as an EO phase compensator for the reflected nonlinear mixing waves.

Preferably, the conducting electrodes are applied with an AC voltage, and the variable dispersion section dynamically alters the nonlinear phase matching condition and functions as an amplitude modulator to the mixing waves via the EO effect.

It is another aspect of the present invention to propose an optical-wave processor, created to simultaneously perform double-pass wavelength conversion and amplitude modulation of optical waves in a crystal substrate comprising a phase-matched nonlinear element section, a variable dispersion section, and a high reflector.

Preferably, the phase-matched nonlinear element section is applicable for second-order frequency conversion processes of SHG, SFG, DFG, and OPG.

Preferably, the phase-matched nonlinear element section is a QPM crystal.

Preferably, the phase-matched nonlinear element section is a nonlinear optical bulk crystal.

Preferably, the phase-matched nonlinear element section is a nonlinear optical waveguide.

Preferably, the high reflector is a high-reflection optical dielectric film coated at the single-pass downstream end of the phase-matched nonlinear element section for reflecting the forward mixing waves back into the phase-matched nonlinear element section to execute a double-pass nonlinear optical process.

Preferably, the high reflector is a high-reflection optical metal film coated at the single-pass downstream end of the phase-matched nonlinear element section for reflecting the forward mixing waves back into the phase-matched nonlinear element section to execute a double-pass nonlinear optical process.

Preferably, the variable dispersion section has a plurality of conducting electrodes.

Preferably, the conducting electrodes are applied with a suitable DC voltage, and the variable dispersion section functions as an EO phase compensator for the reflected nonlinear mixing waves.

Preferably, the conducting electrodes are applied with an AC voltage, and the variable dispersion section dynamically alters the nonlinear phase matching condition and functions as an amplitude modulator to the mixing waves via the EO effect.

Preferably, a dichroic beam splitter is set at the output of the phase-matched nonlinear element section for transmitting the pump wave while separating the double-pass output waves from the backward pump wave; for the waveguide configuration, it is also possible to replace the dichroic beam splitter with a directional coupler, which is built in parallel to the phase-matched nonlinear waveguide near the output end of the double-pass process for extracting the energy of the wavelength converted signals in the backward direction.

Preferably, the directional coupler used in the waveguide configuration has a pair of conducting electrodes functioning as a coupler modulation element for optimizing the coupling efficiency of the directional coupler via the EO effect.

For a design requiring an electrode directly above an optical waveguide, a low-loss dielectric film with an adequate thickness is fabricated between the optical waveguide and the electrode to avoid optical loss in the electrode.

It is another aspect of the present invention to propose an optical-wave processor, created to simultaneously perform double-pass wavelength conversion and amplitude modulation of optical waves in a crystal substrate, comprising a U-shape nonlinear optical waveguide and an electrode-coated variable dispersion section.

Preferably, the U-shape nonlinear optical waveguide, consisting of two parallel phase-matched nonlinear waveguides and a curved optical waveguide, is built for guiding mixing waves and performing double-pass nonlinear wavelength conversion.

Preferably, the phase-matched nonlinear waveguides are applicable for second-order nonlinear wavelength-conversion processes of SHG, SFG, DFG, and OPG.

Preferably, the phase-matched nonlinear waveguides are QPM waveguides.

Preferably, the curved optical waveguide is fabricated on the variable dispersion section.

Preferably, the variable dispersion section has a plurality of conducting electrodes.

Preferably, the conducting electrodes are applied with a suitable DC voltage, and the variable dispersion section functions as an EO phase compensator for the reflected nonlinear mixing waves.

Preferably, the conducting electrodes are applied with an AC voltage, and the variable dispersion section dynamically alters the nonlinear phase matching condition and functions as an amplitude modulator to the mixing waves via the EO effect.

Preferably, a dichroic beam splitter is set at the output end of the U-shape nonlinear optical waveguide for separating the double-pass output waves from the backward pump wave.

Preferably, a directional coupler is built near the output end of the U-shane nonlinear optical waveguide for extracting the energy of the wavelength converted signals in the backward direction.

Preferably, the directional coupler has a pair of conducting electrodes functioning as a coupler modulation element for optimizing the coupling efficiency of said directional coupler via the EO effect.

For a design requiring an electrode directly above an optical waveguide, a low-loss dielectric film with an adequate thickness is fabricated between the optical waveguide and the electrode to avoid optical loss in the electrode.

BRIEF DESCRIPTION OF THE DRAWINGS

The Cartesian coordinate system defined in each figure is only for the convenience of description and does not necessarily coincide with the crystallographic principal coordinate system of a nonlinear crystal. The choice of the crystal orientation for implementing the present invention depends on the principle of nonlinear frequency conversion and electro-optic effects, as known in the practice of prior arts.

FIG. 10 (b) is the cross-sectional view at A—A shown in FIG. 10(a).

FIG. 11 (b) is the cross-sectional view at A—A shown in FIG. 11(a).

FIG. 12 (b) is the cross-sectional view at A—A shown in FIG. 12(a).

FIG. 13 (b) is the cross-sectional view at A—A shown in FIG. 13(a).

FIG. 14 (b) is the cross-sectional view at A—A shown in FIG. 14(a).

DETAILED DESCRIPTION OF THE PREFERRED EMBODIMENT

Figure 1:
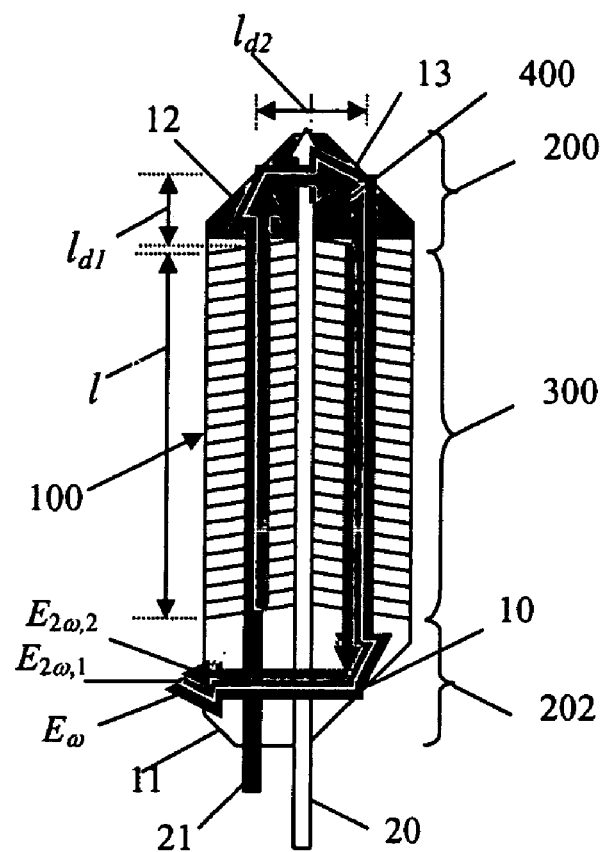
FIG. 1(a) is the schematic illustration of a high-efficiency multiple-pass nonlinear wavelength converter with an EO phase compensator and amplitude modulator as an embodiment of the optical-wave processor of the present invention.
FIG. 1(b) is the side view of the embodiment shown in FIG. 1(a).
Figure 1:
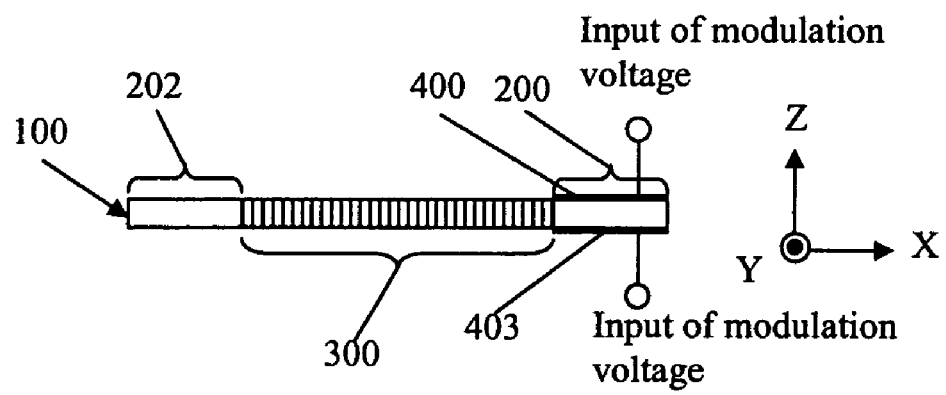

Although this invention is susceptible to embodiments of different forms, some preferred embodiments are described and illustrated in details hereinafter. The present disclosure exemplifies the principle of the invention and is not to be considered a limitation to a broader aspect of the invention to the particular embodiment as described below.

FIG. 1(a) illustrates the first preferred embodiment of a high-efficiency multiple-pass nonlinear wavelength converter with an EO phase compensator and amplitude modulator. The whole optical wave processor is constructed on a monolithic nonlinear crystal substrate 100 comprising a variable dispersion section 200, a phase-matched nonlinear crystal section 300, and a crystal substrate section 202. The nonlinear crystal substrate 100 has four reflection edges 10, 11, 12, 13 to reflect the nonlinear interacting waves along an optical path 21 at least two times longer than otherwise a single-pass path 20 without the reflecting edges. The crystal substrate 202 can be an extension of the phase-matched nonlinear crystal section 300. The phase-matched nonlinear crystal section 300 can be a QPM crystal section.

Without losing generality, we illustrate the functional principle of the present invention by using QPM SHG as an example. To apply this technique to other phase-sensitive nonlinear wavelength conversions, one can follow the same concept described in the SHG example. Throughout the description, we label the variables of the fundamental optical wave with the subscript $\omega$ and those of the SHG wave with the subscript $2\omega$, where $\omega$ is the angular frequency of the fundamental wave. Assume the length of the phase-matched nonlinear crystal section 300 is l, when the pump wave $E_\omega$ enters the crystal substrate 202 and passes through the QPM crystal section, it produces a second harmonic wave $E_{2\omega,1}$ with an intensity $I_{2\omega,1}$. Then, the waves $E_\omega$ and $E_{2\omega,1}$ propagate backward into the QPM crystal section again through two total internal reflections caused by edges 12 and 13 in the variable dispersion section 200. As shown in FIG. 1(a), the spatial distance that the interacting waves $E_\omega$ and $E_{2\omega,1}$ travel in the variable dispersion section is $l_d=2l_{d1}+l_{d2}$. When traveling through the QPM section in the backward path, the pump wave $E_\omega$ again produces another second harmonic wave $E_{2\omega,2}$ with an intensity $I_{2\omega,2}$. All the interacting waves, $E_\omega$, $E_{2\omega,1}$, and $E_{2\omega,2}$, then enter the crystal substrate 202 and finally emit sideway from the crystal substrate 202 by an additional total internal reflection at edge 10. If a conversion path more than two passes is desired and the optical path 21 is properly chosen, all the interacting waves, $E_\omega$, $E_{2\omega,1}$ and $E_{2\omega,2}$, can enter the QPM section again by a total internal reflection at edge 11 after the first round trip.

In the low-conversion limit, $E_\omega$ remains un-depleted and the total second harmonic output intensity produced from the double-pass optical wavelength conversion path 21 can be described by $$I_{2\omega} = I_{2\omega,1} + I_{2\omega,2} - 2\sqrt{I_{2\omega,1}I_{2\omega,2}}\cos(\Delta k_0 l_d + 2\Delta\varphi) \quad (1)$$
$$= \left(\sqrt{I_{2\omega,1}} - \sqrt{I_{2\omega,2}}\right)^2 + 4\sqrt{I_{2\omega,1}I_{2\omega,2}}\sin^2(\Delta k_0 l_d/2 + \Delta\varphi),$$

where $\Delta k_0 l_d = (k_{2\omega} - 2k_\omega)l_d = \pi d_d/l_c$ is the phase mismatch between the pump wave $E_\omega$ and the SHG wave $E_{2\omega,1}$ in the variable dispersion section 200, k is the wave number, $l_c$ is the so-called coherence length in nonlinear wavelength conversion, and $\Delta\phi=\phi_{2\omega}-2\phi_{\omega}$ is the phase difference resulting at the TIR edges. Under the assumption of no pump depletion, the intensities of the double-pass second harmonic waves are approximately the same ($I_{2\omega,1}=I_{2\omega,2}$) in the configuration of the preferred embodiment and Eq. (1) can be simplified to $$I_{2\omega}=4I_{2\omega,1}\sin^2(\Delta k_0 l_d/2+\Delta\phi). \qquad (2)$$

On the other hand, as shown in FIG. 1(a), the QPM grating vector of the QPM section has a specific angle with respect to the propagation direction of the pump wave; thereby, one can translate the nonlinear crystal substrate 100 in the Y direction shown in FIG. 1(b) to vary $l_d$ for the purpose of adjusting the phase mismatch and modulating the total intensity of the second harmonic output wave, $I_{2\omega}$.

As can be seen from Eq. (1), the total intensity of the second harmonic wave, $I_{2\omega}$, is the interference intensity of $E_{2\omega,1}$ and $E_{2\omega,2}$ and the amplitude modulation of $I_{2\omega}$ can be achieved by varying the relative phase between $E_{2\omega,1}$ and $E_{2\omega,2}$, which is equivalent to varying the relative phase between the pump wave $E_{\omega}$ and the second harmonic wave $E_{2\omega,1}$ in the variable dispersion section 200. Notably the relative phase $\Delta k_0 l_d$ is a function of the refractive indices of the fundamental and the SHG waves. Specifically, the total phase mismatch is given by $$\Delta\phi\equiv\Delta k_0 l_d+2\Delta\phi=2\pi(n_{2\omega}-n_\omega)l_d/\lambda_{2\omega}+2\Delta\phi, \qquad (3)$$

where n is the refractive index and λ is the wavelength. In an electro-optic crystal, the refractive index is a function of the electric field, given by n(E)=n rn³E/2, where E is the applied electric field, n is the refractive index in the absence of the electric field, and r is the Pockels coefficient. Using a periodically poled lithium niobate (PPLN) crystal as an example, the fundamental and SHG waves are polarized along the optic axis, having extraordinary refractive indices $n_{\omega,e}$ and $n_{2\omega,e}$, respectively. Assume that the preferred embodiment in FIG. 1 is a Z-cut PPLN crystal. If a voltage is applied to the variable dispersion section 200, the total phase mismatch $\Delta\phi$ can be recast into the expression $$\Delta\phi=\Delta\phi_0-\pi\frac{V}{V_\pi}, \qquad (4)$$

where $\Delta\phi_0$ is the phase mismatch in the absence of the electric field, and $V_\pi$ is the half-wave voltage given by $$V_\pi=\frac{d}{l_d}\frac{\lambda_{2\omega}}{(r_{33,2\omega}n_{2\omega,e}^3-r_{33,\omega}n_{\omega,e}^3)}, \qquad (5)$$

where the parameter d is the separation distance of the electrodes. Equation (5) clearly differs from that for a conventional birefringence electro-optic amplitude modulator between two crossed polarizers. A birefringence amplitude modulator replies on the birefringence of an electro-optic material, whereas the present invention replies on dispersion in an electro-optic nonlinear optical material.

Therefore the EO phase control can be implemented by building the first conducting electrode 400 and the second conducting electrode 403 on the +Z and the −Z surfaces of the variable dispersion section 200, respectively, as shown in FIG. 1(b), if an electric field is desired in the crystal cutting direction to induce the electro-optic effect. When a DC compensating voltage is applied to the electrodes and maximizes the sinusoidal term in Eq. (2), the nonlinear optical wave processor can be fully phase matched and has the maximum double-pass conversion efficiency. When a suitable AC voltage is applied to the electrodes, the relative phase $\Delta k_0 l_d$ is varied with time and the total SHG output intensity is therefore modulated in its amplitude.

For a configuration with more than two optical passes, the first conducting electrode 400 is decomposed into a plurality of conducting electrodes that are constructed in accordance with the optical paths from different passes in the variable dispersion section 200. Each electrode is used to tune the phase mismatch of the mixing waves in the optical path under which the electrode is fabricated. By applying adequate DC and/or AC voltages to the electrodes, the present invention functions as a high-efficiency multiple-pass wavelength converter and amplitude modulator.

Figure 2:
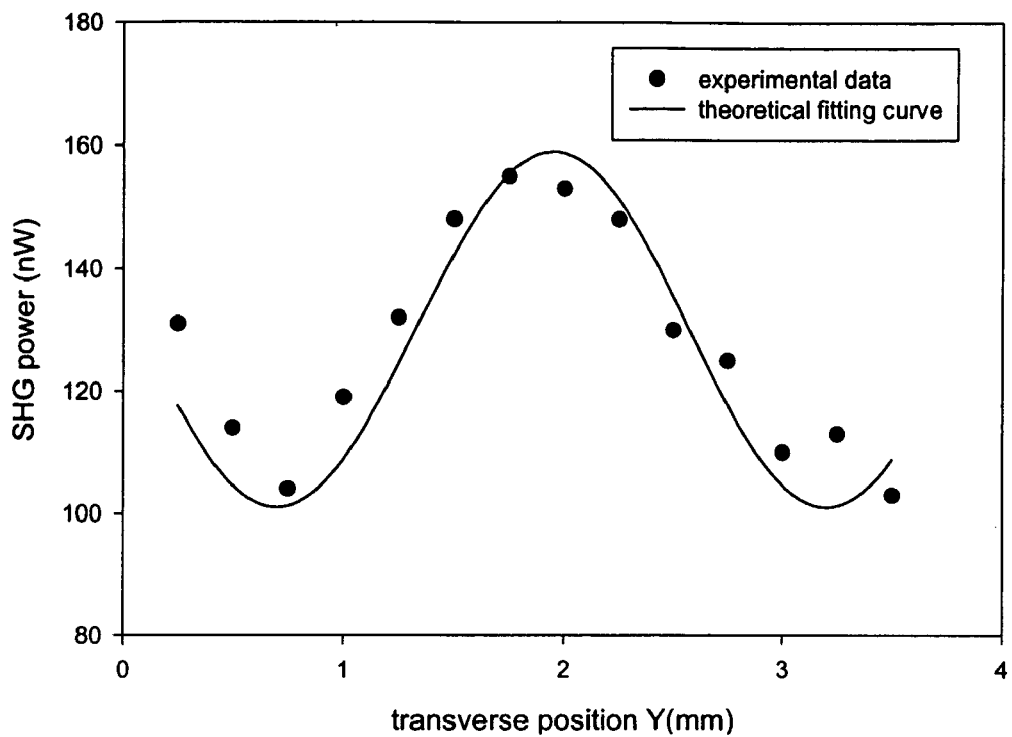
FIG. 2(a) is a graph illustrating the experimentally measured laser output power that varies with a variable dispersion length in the present invention.
FIG. 2(b) is a graph illustrating the experimentally measured laser output power that varies with an applied voltage in the variable dispersion section of the present invention.
Figure 2:
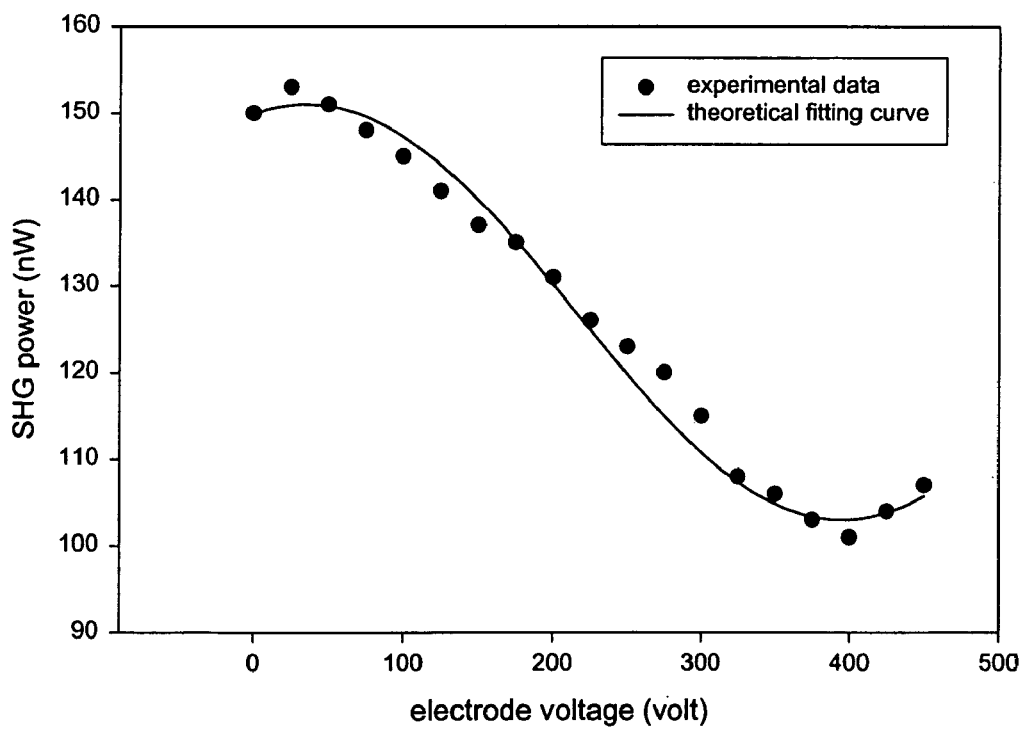

The preferred embodiment in FIG. 1 was experimentally demonstrated in a Z-cut PPLN crystal. The fundamental wave is a linearly polarized 1064-nm laser from a diode-pumped Nd:YVO₄ microchip laser producing 4 mW CW power. The thickness of the PPLN crystal was 0.5 mm, the length of the PPLN section 300 was 2 cm, and the dispersion section was coated with electrodes on the ±Z surfaces. The PPLN grating period was Λ=20.25 μm, phase matched to the 3$^{rd}$-order SHG of the 1064-nm wave at 60° C. The two PPLN grating vectors in the forward and backward paths form ±2.7 mrad angles with respect to the X axis. Without the ±2.7 mrad angles, the optical path in the dispersion section is the width of the device or 1.5 cm in the experiment. With the ±2.7 mrad angles, the optical path in the dispersion section and therefore the SHG output is variable, if the PPLN crystal is translated sideway relative to a stationary pump laser propagating in the X direction. FIG. 2(a) shows that the measured SHG output power varied periodicall the PPLN crystal was translated along the Y direction relative to a stationary pump beam propagating in the X direction. The 2.5 mm periodicity in the curve corresponds to the change of 2 coherence lengths or 13.5 μm in the dispersion-section length, as expected from the ±2.7 mrad design angles of the PPLN grating vectors. FIG. 2(b) shows the SHG output power versus the electrode voltage, from which one can deduce a half-wave voltage of 360 volts or 1.1 V×t(μm)/$l_d$(cm), where t is the electrode separation in μm and $l_d$ is the electrode length in cm. Therefore in the following preferred embodiments employing nonlinear optical waveguides, the electrode separation can be on the order of the waveguide width or ~10 μm and the half-wave voltage is only about 10 V.

Figure 3:
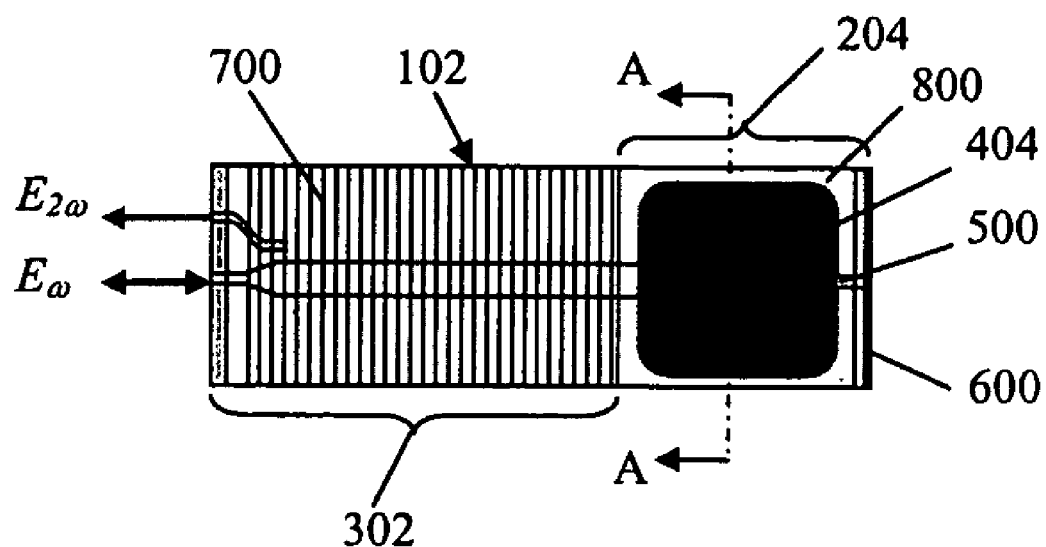
FIG. 3(a) is the schematic illustration of another high-efficiency multiple-pass nonlinear wavelength converter with an EO phase compensator and amplitude modulator as an embodiment of the optical-wave processor of the present invention.
FIG. 3(b) is the cross-sectional view at A—A shown in FIG. 3(a).
Figure 3:
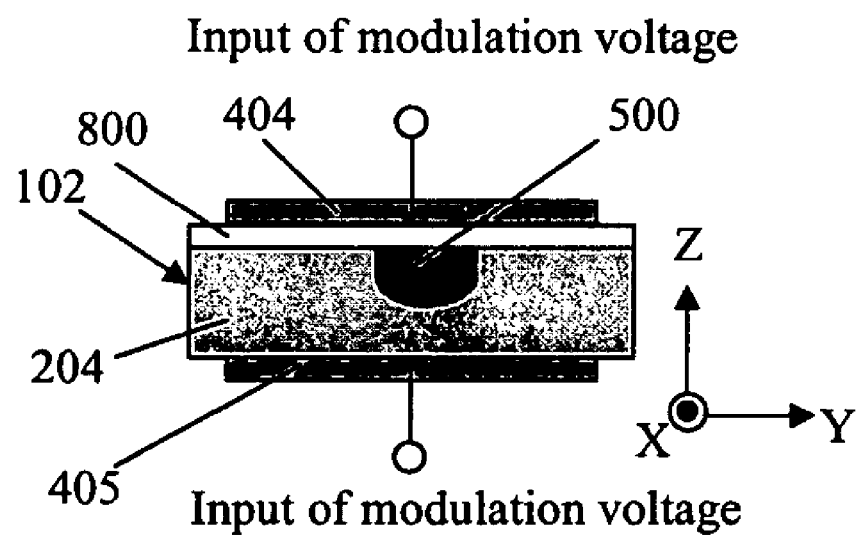

Base upon the same principle, the present invention of a high-efficiency multiple-pass nonlinear wavelength converter with an EO phase compensator and amplitude modulator can be constructed on an optical waveguide device. FIG. 3(a) and FIG. 3(b) schematically illustrate the second preferred embodiment of a high-efficiency double-pass nonlinear wavelength converter with an EO phase compensator and amplitude modulator in an optical waveguide. The whole structure is constructed on a monolithic nonlinear crystal substrate 102 comprising a variable dispersion section 204, and a phase-matched nonlinear crystal section 302. A nonlinear optical waveguide 500 is built along the X axis on the +Z surface of the nonlinear crystal substrate 102 for guiding optical waves with specific wavelengths and modes in the phase-matched nonlinear crystal section 302 and in the variable dispersion section 204. In the phase-matched nonlinear crystal section 302, the nonlinear waveguide has a proper design for performing a desirable nonlinear wavelength conversion. The single pass output end of the nonlinear optical waveguide 500 is coated with a high reflector 600 to reflect the forward guiding waves, including the pump wave and the wavelength converted waves, back into the nonlinear optical waveguide 500 to form a double-pass guiding path. Using SHG as an example, the second-harmonic output intensity, $I_{2\omega}$, in the backward direction, can be efficiently coupled out by a directional coupler 700 built on the nonlinear crystal substrate 102 with an adequate length and spacing in parallel to the nonlinear optical waveguide 500.

According to Eq. (2), the conversion efficiency of the double-pass SHG in the second preferred embodiment is enhanced due to the doubled interaction length. The enhanced conversion efficiency can be as high as four times when the interaction length is doubled, according to the low-efficiency model of nonlinear wavelength conversion. From Eqs. (1–5), a phase compensator and amplitude modulator comprising a plurality of conducting electrodes is fabricated on the variable dispersion section 204 as an electro-optic phase tuner to the phase mismatch between the reflected mixing waves. The modulation electrode comprises a first conducting electrode 404 on a buffered layer on the +Z surface and a second conducting electrode 405 on the −Z surfaces in the variable dispersion section 204. A voltage supply is used to provide an adequate modulation voltage to the modulation electrodes and introduce a voltage difference across the +Z and the −Z surfaces. The phase mismatch induced between the forward and backward paths is therefore tuned through the EO effect. Thus, the interference intensity from $E_{2\omega,1}$ and $E_{2\omega,2}$ can be modulated in amplitude if an AC voltage is used, and high conversion-efficiency phase-matched double-pass nonlinear wavelength conversion can be accomplished if a suitable DC offset voltage is used. In this preferred embodiment, the phase-matched nonlinear crystal section 302 can be a QPM crystal section, and the high reflector 600 can be a high-reflection optical dielectric film or a high-reflection optical metal film directly coated at the single-pass downstream end of the nonlinear optical waveguide 500. It should be noted that this preferred embodiment is also applicable to a bulk nonlinear crystal, in which the waveguide is removed and mixing waves propagates in the bulk region of the nonlinear crystal.

Figure 4:
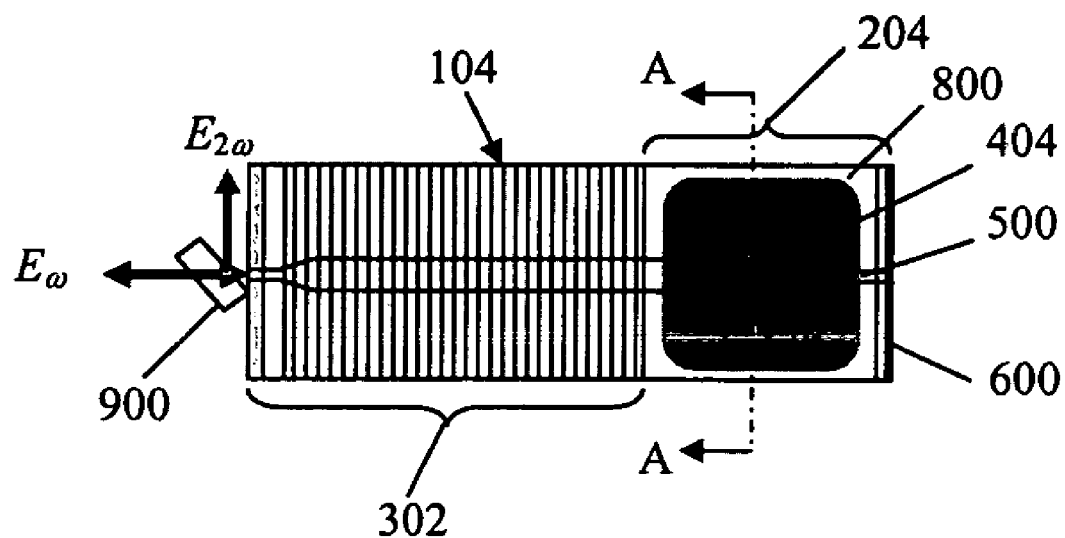
FIG. 4(a) is the schematic illustration of another high-efficiency multiple-pass nonlinear wavelength converter with an EO phase compensator and amplitude modulator as an embodiment of the optical-wave processor of the present invention.
FIG. 4(b) is the cross-sectional view at A—A shown in FIG. 4(a).
Figure 4:
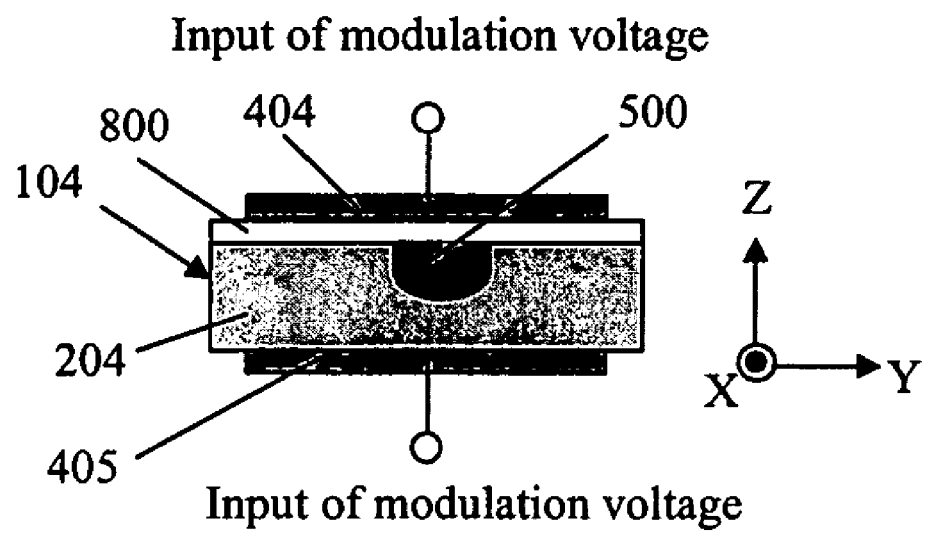

FIG. 4(a) and FIG. 4(b) schematically illustrate the third preferred embodiment of a high-efficiency double-pass nonlinear wavelength converter with an EO phase compensator and amplitude modulator. In the preferred embodiment, the functional principles of the nonlinear crystal substrate 104, the variable dispersion section 204, the phase-matched nonlinear crystal section 302, the first conducting electrode 404, the second conducting electrode 405, the nonlinear optical waveguide 500, the high reflector 600, and the buffered layer 800 are the same as those in the second preferred embodiment. The difference is that the third preferred embodiment employs a dichroic beam splitter 900 as a replacement of the directional coupler 700 in the second preferred embodiment. The dichroic beam splitter is set at the input end of the nonlinear optical waveguide 500 and used for separating the reflected pump wave from the wavelength converted backward propagation waves while transmitting the forward pump wave. In the same spirit, the dichroic beam splitter can be a suitable wavelength-division multiplexer such as a wavelength-dependent fiber circulator.

Figure 5:
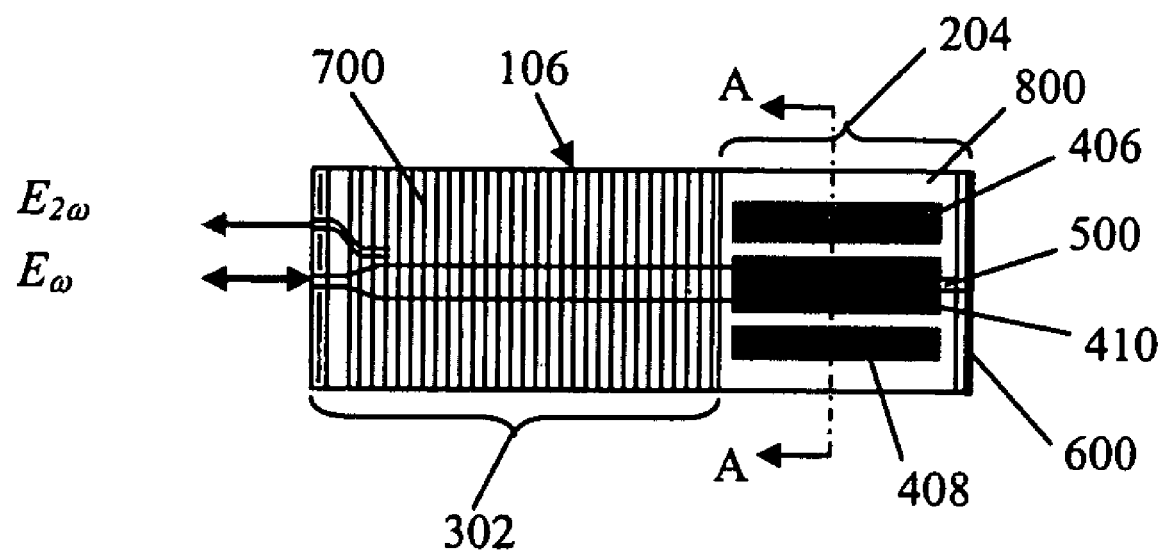
FIG. 5(a) is the schematic illustration of another high-efficiency multiple-pass nonlinear wavelength converter with an EO phase compensator and amplitude modulator as an embodiment of the optical-wave processor of the present invention.
FIG. 5(b) is the cross-sectional view of the A—A hatches shown in FIG. 3(a).
Figure 5:
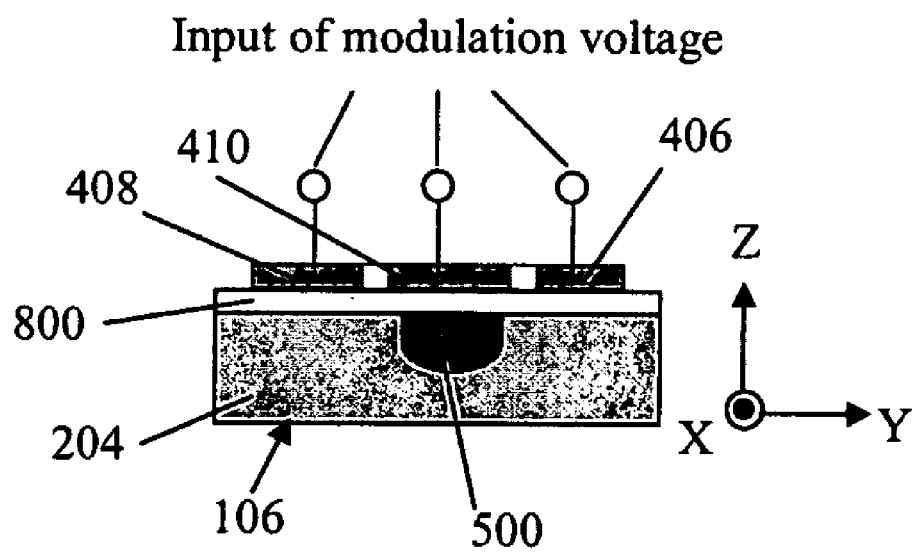

FIG. 5(a) and FIG. 5(b) schematically illustrate the fourth preferred embodiment of a high-efficiency double-pass nonlinear wavelength converter with an EO phase compensator and amplitude modulator. In the preferred embodiment, the functional principles of the nonlinear crystal substrate 106, the variable dispersion section 204, the phase-matched nonlinear crystal section 302, the nonlinear optical waveguide 500, the high reflector 600, the buffered layer 800, and the directional coupler 700 are the same as those in the second preferred embodiment. The difference is that the EO phase compensator and amplitude modulator of the fourth preferred embodiment now has three electrodes, the first conducting electrode 406, the second electrode 408, and the third electrode 410. The first conducting electrode 406 and the second electrode 408 sandwiches the third conducting electrode 410 with all three electrodes parallel to each other and above a buffered layer 800 in the variable dispersion section 204. The third electrode 410 is aligned with the longitudinal direction of the nonlinear optical waveguide 500. The first and the second conducting electrodes 406, 408 are at a voltage potential that is in general different from the one at the third conducting electrode 410. Therefore, there is an electric-field component normal to the crystal cutting surface in the nonlinear optical waveguide 500 and in the variable dispersion section 204. Such an electrode arrangement is particularly suitable for inducing an EO effect requiring an electric field along the surface normal direction of the nonlinear crystal, the Z direction in FIG. 5(b). When the three electrodes are applied with a suitable DC voltage, the preferred embodiment functions as a high-efficiency phase-matched double-pass wavelength converter; when the electrodes are applied with a suitable AC voltage, the preferred embodiment functions as a high-efficiency wavelength converter with a built-in amplitude modulator.

Figure 6:
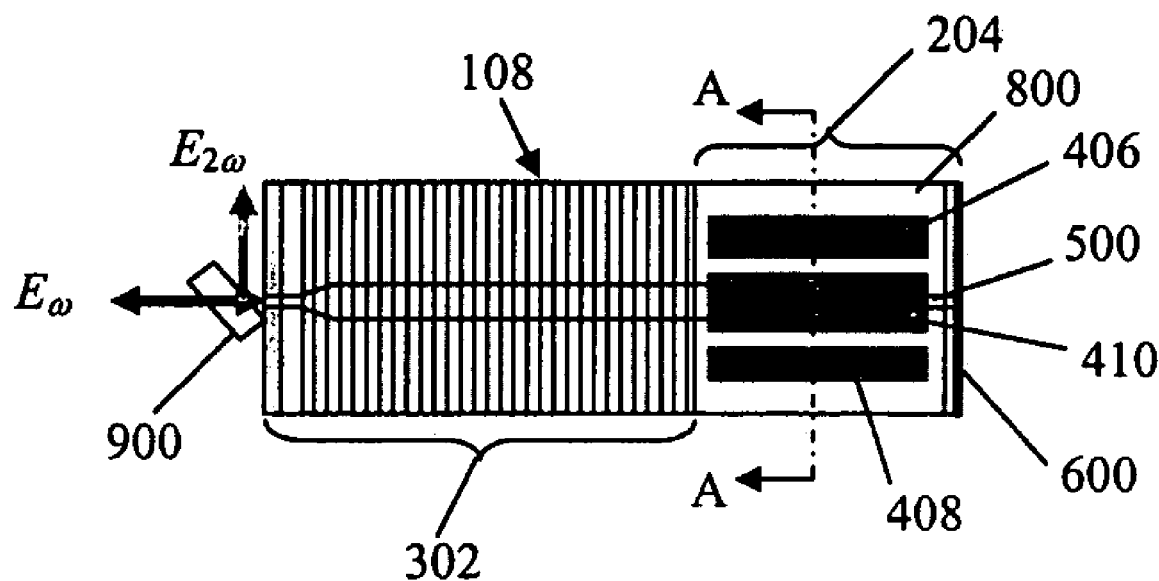
FIG. 6(a) is the schematic illustration of another high-efficiency multiple-pass nonlinear wavelength converter with an EO phase compensator and amplitude modulator as an embodiment of the optical-wave processor of the present invention.
FIG. 6(b) is the cross-sectional view at A—A shown in FIG. 6(a).
Figure 6:
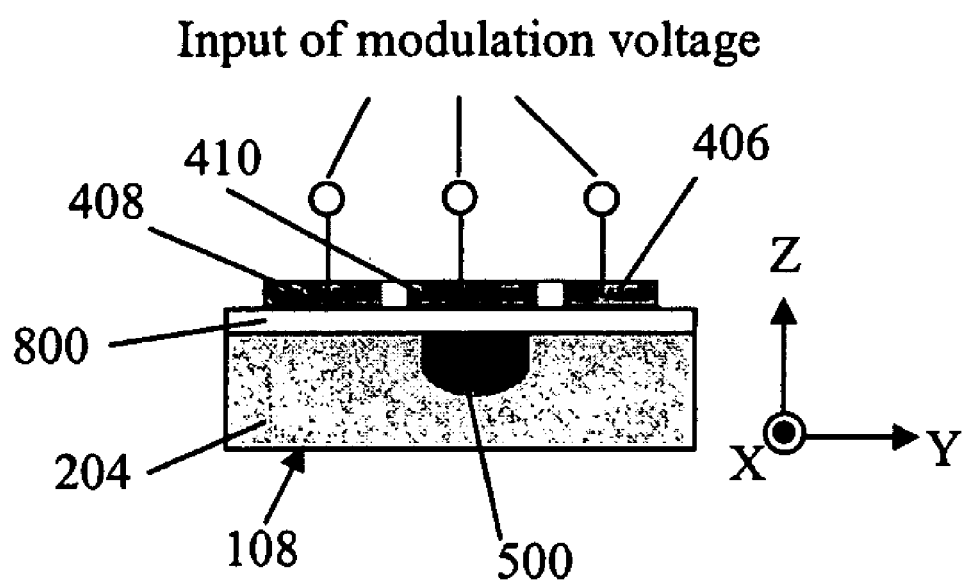

FIG. 6(a) and FIG. 6(b) schematically illustrate the fifth preferred embodiment of a high-efficiency double-pass nonlinear wavelength converter with an EO phase compensator and amplitude modulator. In the preferred embodiment, the functional principles of the nonlinear crystal substrate 108, the variable dispersion section 204, the phase-matched nonlinear crystal section 302, the first conduction electrode 406, the second conducting electrode 408, the third conducting electrode 410, the nonlinear optical waveguide 500, the high reflector 600, and the buffered layer 800 are the same as those in the fourth preferred embodiment. The difference is that the fifth preferred embodiment employs a dichroic beam splitter 900 as a replacement of the directional coupler 700 in the fourth preferred embodiment. The dichroic beam splitter is set at the input end of the nonlinear optical waveguide 500 and used for separating the reflected pump wave from the wavelength-converted backward waves while transmitting the forward pump wave. In the same spirit, the dichroic beam splitter can be replaced by a suitable wavelength-division multiplexer such as a wavelength-dependent fiber circulator.

Figure 7:
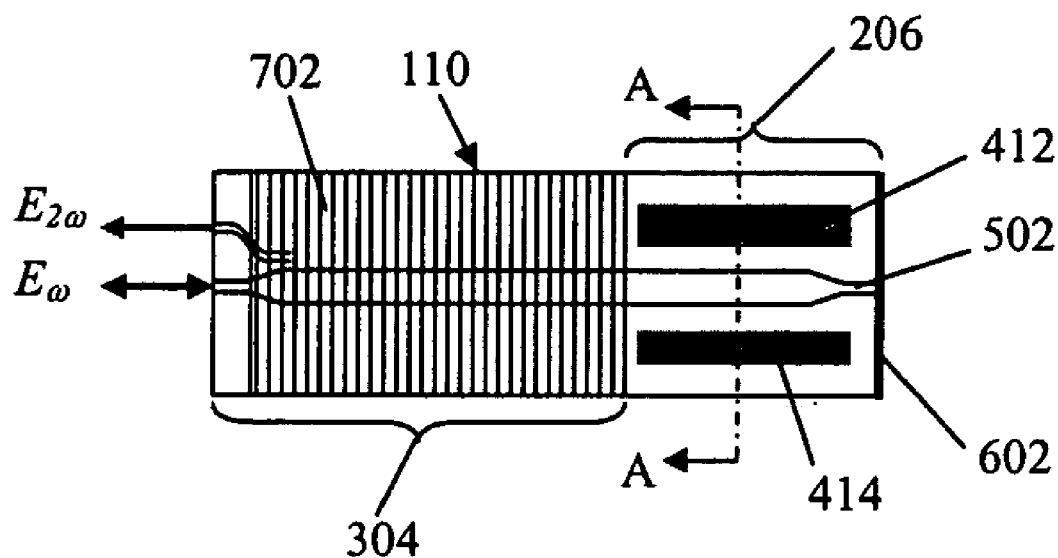
FIG. 7(a) is the schematic illustration of another high-efficiency multiple-pass nonlinear wavelength converter with an EO phase compensator and amplitude modulator as an embodiment of the optical-wave processor of the present invention.
FIG. 7(b) is the cross-sectional view at A—A shown in FIG. 7(a).
Figure 7:
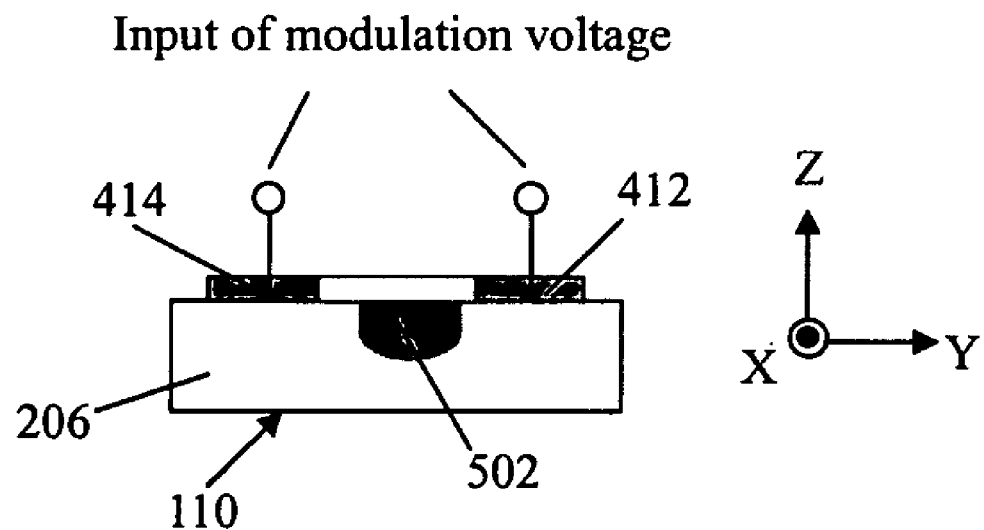

FIG. 7(a) and FIG. 7(b) schematically illustrate the sixth preferred embodiment of a high-efficiency double-pass nonlinear wavelength converter with an EO phase compensator and amplitude modulator. In the preferred embodiment, the functional principles of the nonlinear crystal substrate 110, the variable dispersion section 206, the phase-matched nonlinear crystal section 304, the nonlinear optical waveguide 502, the high reflector 602, and the directional coupler 702 are the same as those in the second preferred embodiment. The difference is that the sixth preferred embodiment does not build a dielectric buffered layer 800 on the +Z surface of the nonlinear crystal substrate 110, because the electrodes are not arranged immediately above an optical waveguide and do not introduce optical loss to the optical waves. The phase compensator and amplitude modulator comprises the first conducting electrode 412 and a second conducting electrode 414. The first conducting electrode 412 and the second electrode 414 are arranged in parallel and along the two sides of the nonlinear optical waveguide 502 on the +Z surface of the nonlinear crystal substrate 110 and in the variable dispersion section 206. This arrangement is particularly useful for inducing an EO effect requiring an electric field in the Y direction. By applying an adequate voltage to the electrodes, a voltage difference occurs across the two sides of the nonlinear optical waveguide 502 in the variable dispersion section 206.

Figure 8:
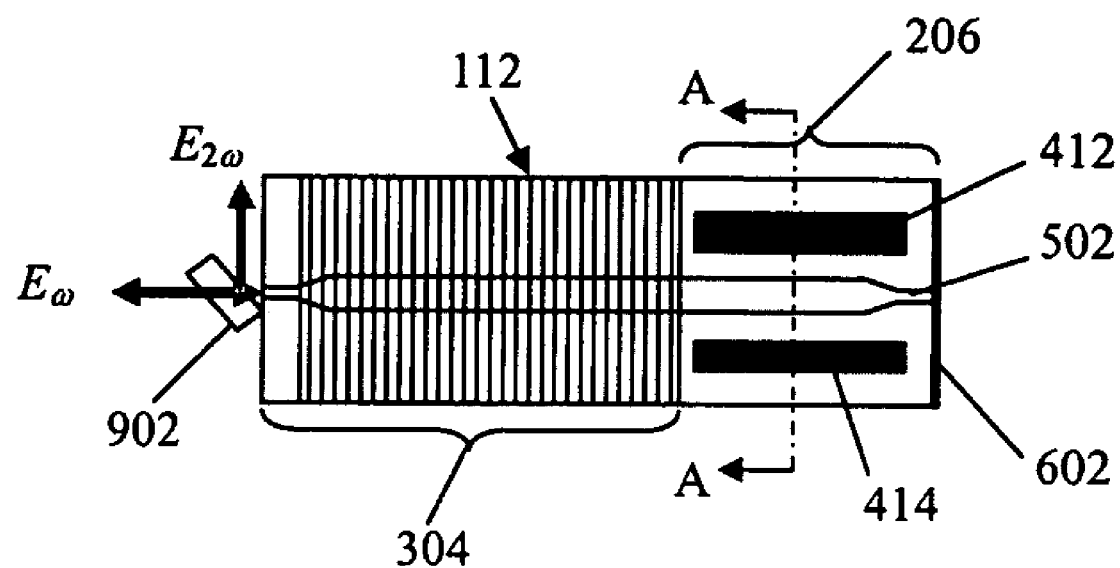
FIG. 8(a) is the schematic illustration of another high-efficiency multiple-pass nonlinear wavelength converter with an EO phase compensator and amplitude modulator as an embodiment of the optical-wave processor of the present invention.
FIG. 8(b) is the cross-sectional view at A—A shown in FIG. 8(a).
Figure 8:
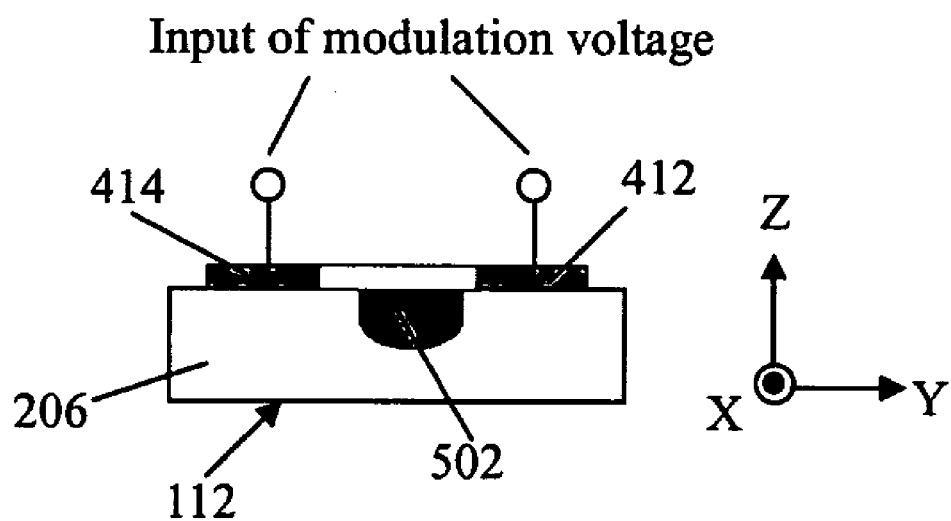

FIG. 8(a) and FIG. 8(b) schematically illustrate the seventh preferred embodiment of a high-efficiency double-pass nonlinear wavelength converter with an EO phase compensator and amplitude modulator. In the preferred embodiment, the functional principles of the nonlinear crystal substrate 112, the variable dispersion section 206, the phase-matched nonlinear crystal section 304, the first conduction electrode 412, the second conducting electrode 414, the nonlinear optical waveguide 502, and the high reflector 602 are the same as those in the sixth preferred embodiment. The difference is that the seventh preferred embodiment employs a dichroic beam splitter 902 as a replacement of the directional coupler 702 in the sixth preferred embodiment. The dichroic beam splitter is set at the input end of the nonlinear optical waveguide 502 and used for separating the reflected pump wave from the wavelength-converted backward waves while transmitting the forward pump wave. In the same spirit, the dichroic beam splitter can be replaced by a suitable wavelength-division multiplexer such as a wavelength-dependent fiber circulator.

Figure 9:
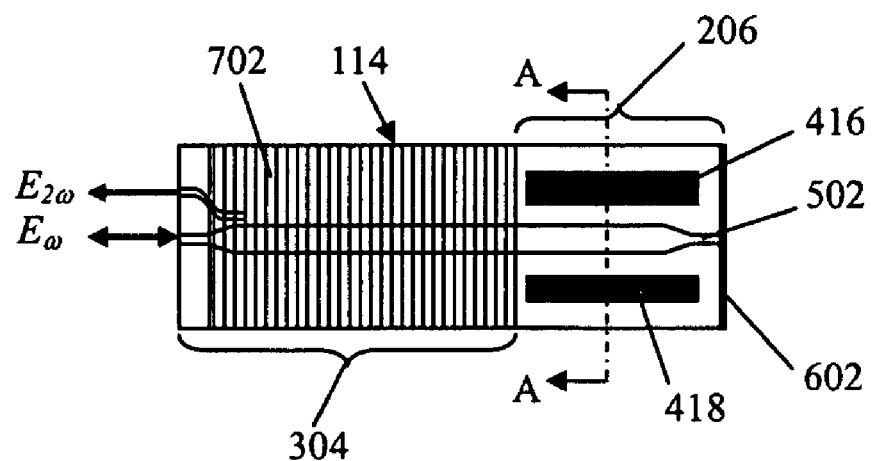
FIG. 9(a) is the schematic illustration of another high-efficiency multiple-pass nonlinear wavelength converter with an EO phase compensator and amplitude modulator as an embodiment of the optical-wave processor of the present invention.
FIG. 9(b) is the cross-sectional view at A—A shown in FIG. 9(a).
Figure 9:
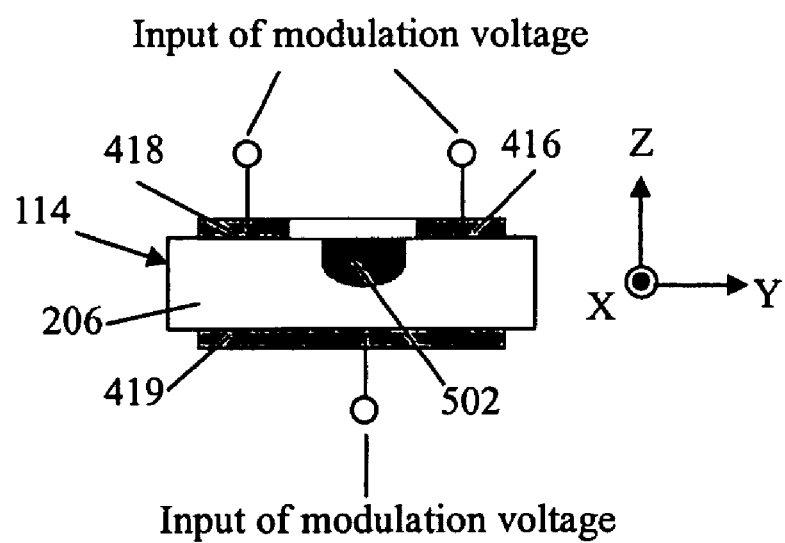

FIG. 9(a) and FIG. 9(b) schematically illustrate the eighth preferred embodiment of a high-efficiency double-pass nonlinear wavelength converter with an EO phase compensator and amplitude modulator. In the preferred embodiment, the functional principles of the nonlinear crystal substrate 114, the variable dispersion section 206, the phase-matched nonlinear crystal section 304, the nonlinear optical waveguide 502, the high reflector 602, and the directional coupler 702 are the same as the sixth preferred embodiment. The difference is that the EO phase compensator and amplitude modulator of the eighth preferred embodiment now has three electrodes, the first conducting electrode 416, the second electrode 418, and the third electrode 419. The electrode 419 can be paired with either electrode 418 or 416 at a voltage potential that is in general different from that at the rest electrode. This electrode configuration is particular useful for pulling the electric flux lines towards the waveguide depth direction.

Figure 10:
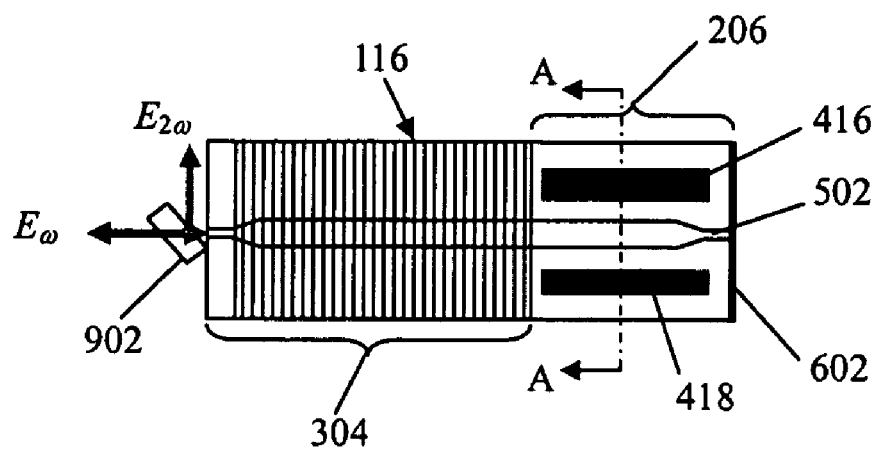
FIG. 10 (a) is the schematic illustration of another high-efficiency multiple-pass nonlinear wavelength converter with an EO phase compensator and amplitude modulator as an embodiment of the optical-wave processor of the present invention.
Figure 10:
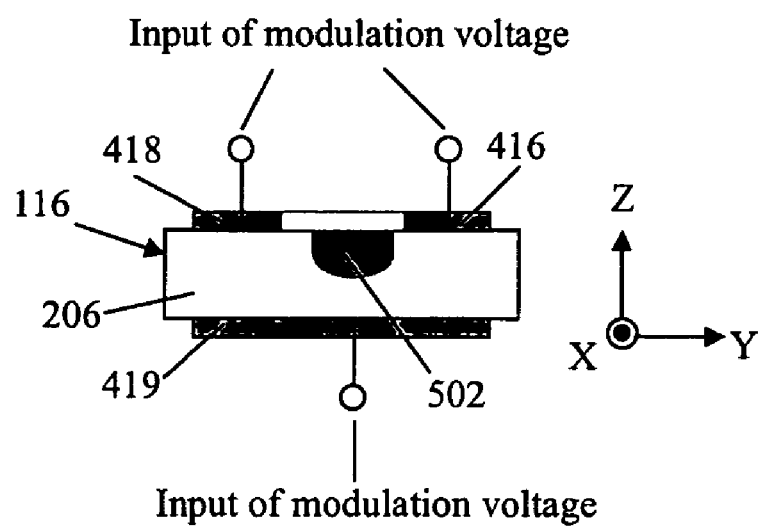

FIG. 10 (a) and FIG. 10 (b) schematically illustrate the ninth preferred embodiment of a high-efficiency double-pass nonlinear wavelength converter with an EO phase compensator and amplitude modulator. In the preferred embodiment, the functional principles of the nonlinear crystal substrate 116, the variable dispersion section 206, the phase-matched nonlinear crystal section 304, the first conduction electrode 416, the second conducting electrode 418, the third conducting electrode 419, the nonlinear optical waveguide 504, and the high reflector 602 are the same as those of the eighth preferred embodiment. The difference is that the ninth preferred embodiment employs a dichroic beam splitter 902 as a replacement of the directional coupler 702 in the eighth preferred embodiment. The dichroic beam splitter is set at the input end of the nonlinear optical waveguide 502 and used for separating the reflected pump wave from the wavelength-converted backward waves while transmitting the forward pump wave. In the same spirit, the dichroic beam splitter can be replaced by a suitable wavelength-division multiplexer such as a wavelength-dependent fiber circulator.

Figure 11:
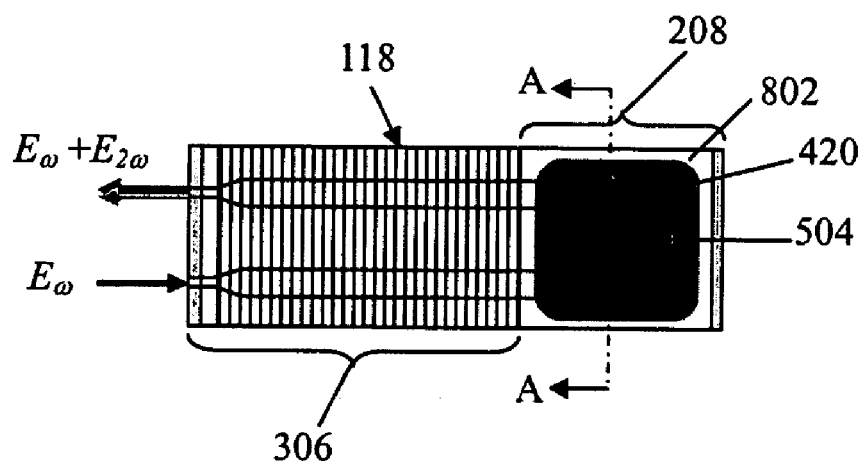
FIG. 11 (a) is the schematic illustration of another high-efficiency multiple-pass nonlinear wavelength converter with an EO phase compensator and amplitude modulator as an embodiment of the optical-wave processor of the present invention.
Figure 11:
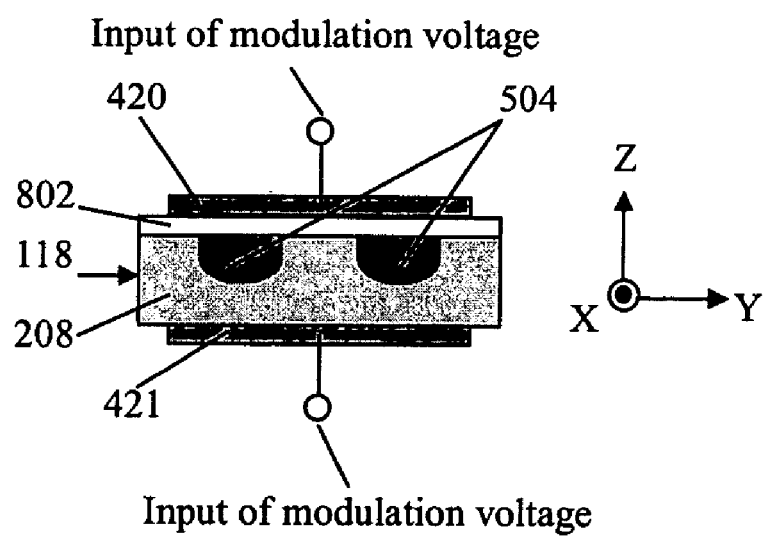

FIG. 11 (a) and FIG. 11 (b) schematically illustrate the tenth preferred embodiment of a high-efficiency double-pass nonlinear wavelength converter with an EO phase compensator and amplitude modulator. In the preferred embodiment, the functional principles of the nonlinear crystal substrate 118, the variable dispersion section 208, the phase-matched nonlinear crystal section 306, the first conduction electrode 420, the second conducting electrode 421, and the buffered layer 802 are the same as those of the second preferred embodiment. The difference is that the nonlinear optical waveguide 504 in the tenth preferred embodiment is a U-shape nonlinear optical waveguide for routing back the mixing waves to continue the nonlinear wavelength conversion process in the same nonlinear optical crystal. In the U-shape waveguide structure, the effective interaction length of the nonlinear wavelength conversion process becomes twice compared to the otherwise single-pass design in the prior art. It is also possible to employ a directional coupler or a dichroic beam splitter to separate the pump wave from the wavelength converted backward waves in the double-pass guiding path.

Figure 12:
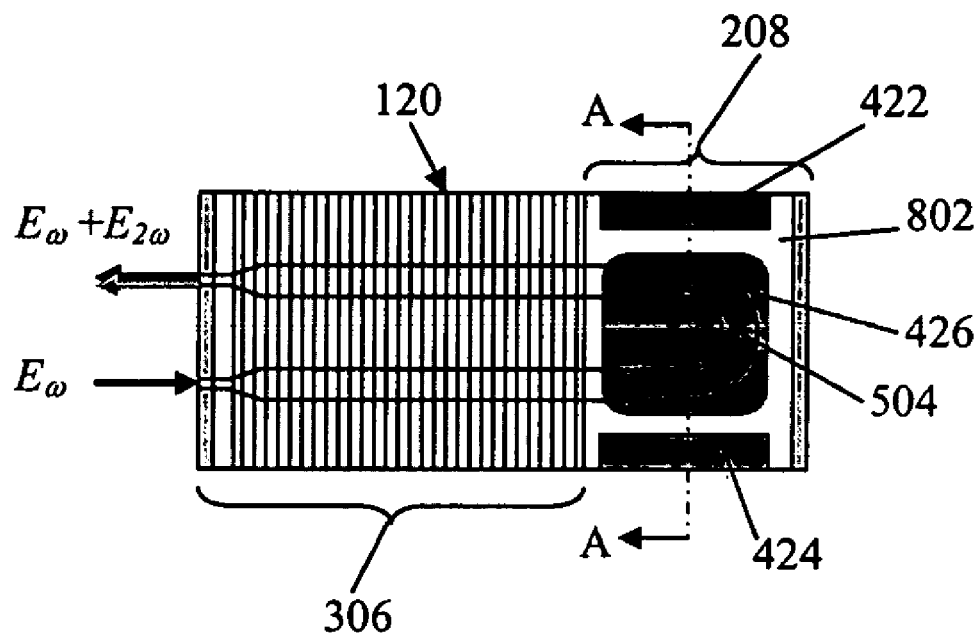
FIG. 12 (a) is the schematic illustration of another high-efficiency multiple-pass nonlinear wavelength converter with an EO phase compensator and amplitude modulator as an embodiment of the optical-wave processor of the present invention.
Figure 12:
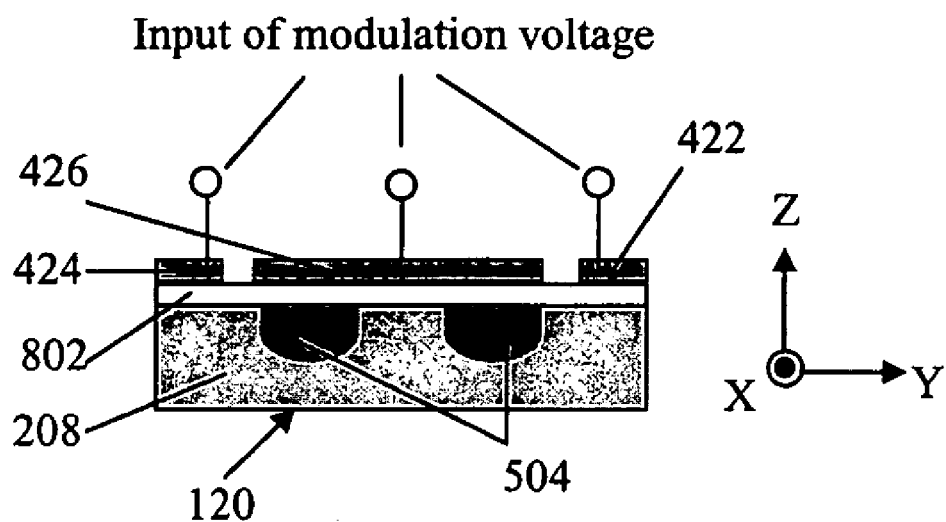

FIG. 12 (a) and FIG. 12 (b) schematically illustrate the eleventh preferred embodiment of a high-efficiency double-pass nonlinear wavelength converter with an EO phase compensator and amplitude modulator. In the preferred embodiment, the functional principles of the nonlinear crystal substrate 120, the variable dispersion section 208, the phase-matched nonlinear crystal section 306, the nonlinear optical waveguide 504 and the buffered layer 800 are the same as those of the tenth preferred embodiment. The difference is that the phase compensator and amplitude modulator now has three electrodes, the first conducting electrode 422, the second electrode 424, and the third electrode 426. The three conducting electrodes, having an adequate spacing with each other, are fabricated on the dielectric buffer layer 802 above the +Z surface of the variable dispersion section 208. This electrode arrangement has the same purpose as that in the fourth preferred embodiment.

Figure 13:
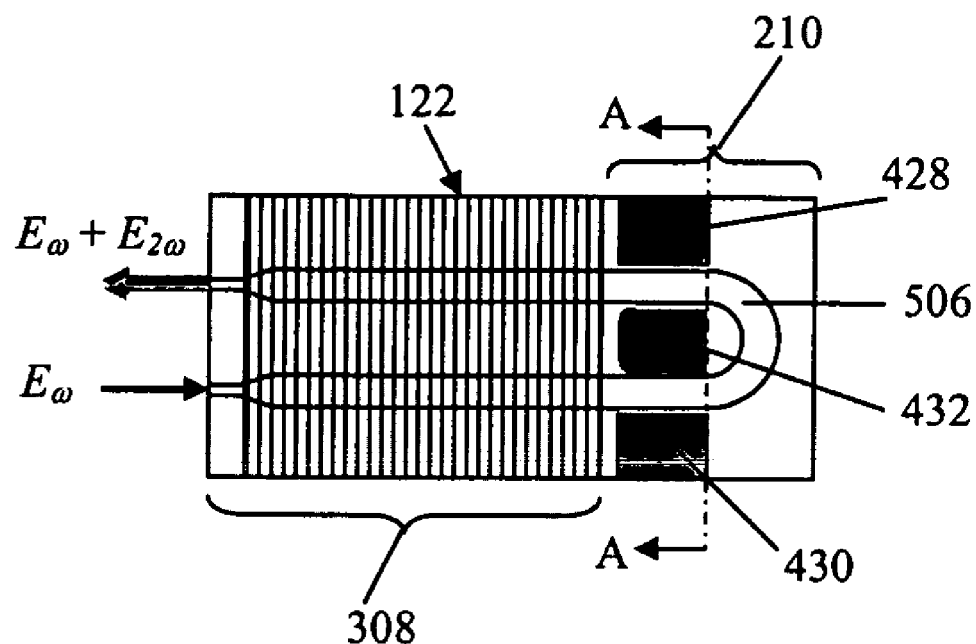
FIG. 13 (a) is the schematic illustration of another high-efficiency multiple-pass nonlinear wavelength converter with an EO phase compensator and amplitude modulator as an embodiment of the optical-wave processor of the present invention.
Figure 13:
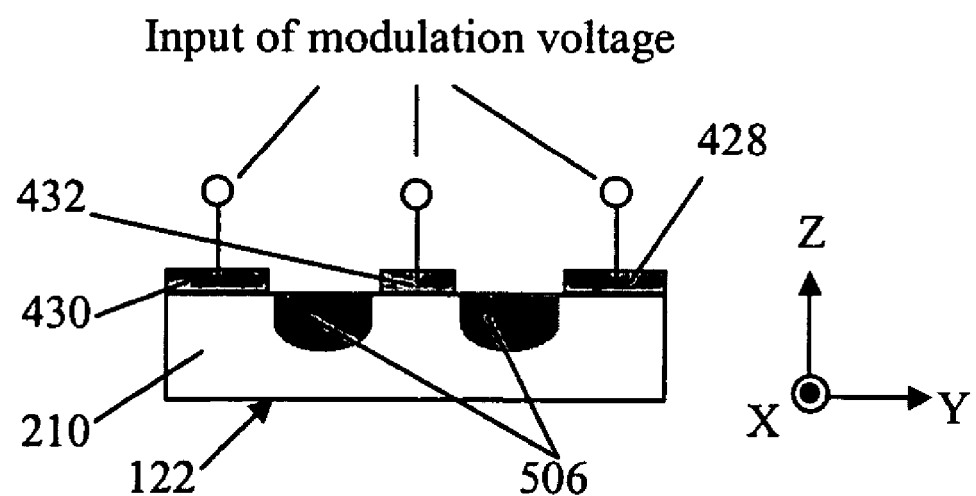

FIG. 13 (a) and FIG. 13 (b) schematically illustrate the twelfth preferred embodiment of a high-efficiency double-pass nonlinear wavelength converter with an EO phase compensator and amplitude modulator. In the preferred embodiment, the functional principles of the nonlinear crystal substrate 122, the variable dispersion section 210, the phase-matched nonlinear crystal section 308, and the nonlinear optical waveguide 506 are the same as those of the tenth preferred embodiment. The difference is that the twelfth preferred embodiment does not build a dielectric buffered layer 802 on the +X surface of the nonlinear crystal substrate 122, because the electrode arrangement does not introduce optical loss to the optical waves. The phase compensator and amplitude modulator consists of the first conducting electrode 428, the second electrode 430, and the third electrode 432. In operation, the voltage on either the electrode-428 or the electrode-32 side is the highest and steps down towards the other side. The electrode arrangement is particularly useful for generating an electric-field component tangential to the crystal surface, if required for a certain EO crystal.

Figure 14:
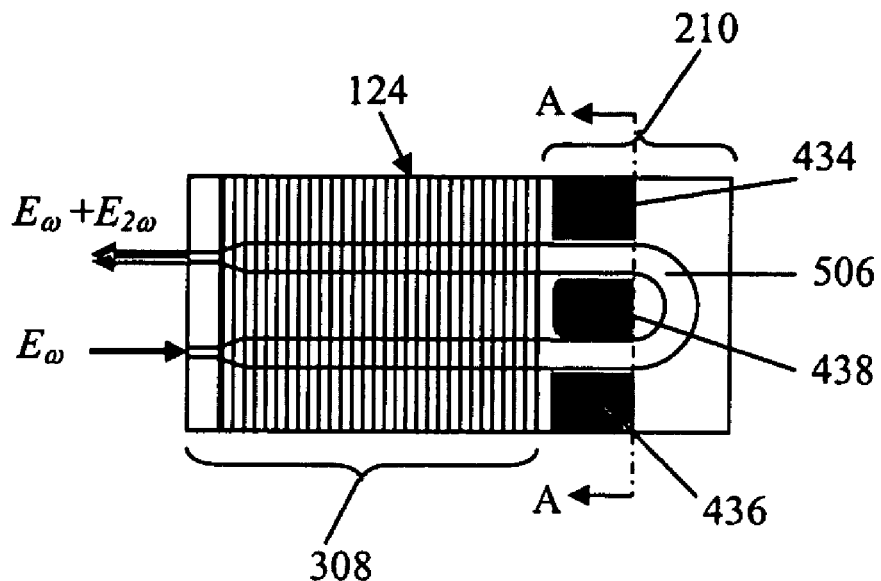
FIG. 14 (a) is the schematic illustration of another high-efficiency multiple-pass nonlinear wavelength converter with an EO phase compensator and amplitude modulator as an embodiment of the optical-wave processor of the present invention.
Figure 14:
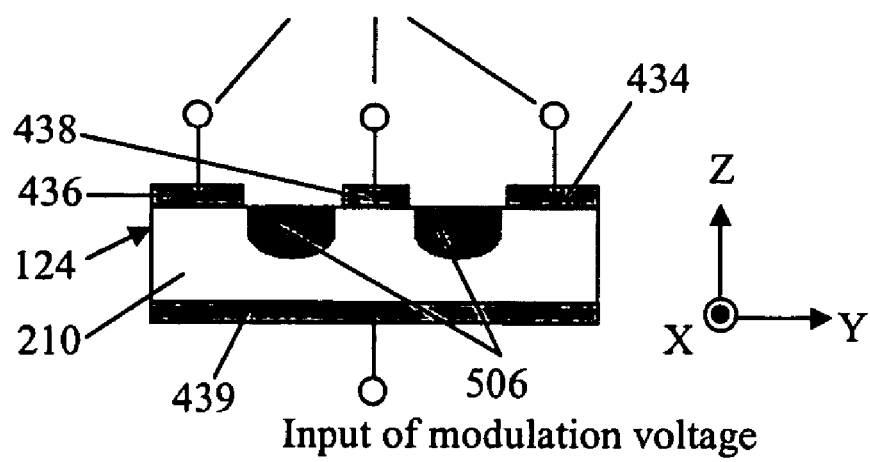

FIG. 14 (a) and FIG. 14 (b) schematically illustrate the thirteenth preferred embodiment of a high-efficiency multiple-pass nonlinear wavelength converter with an EO phase compensator and amplitude modulator. In the preferred embodiment, the functional principles of the nonlinear crystal substrate 124, the variable dispersion section 210, the phase-matched nonlinear crystal section 308, and the nonlinear optical waveguide 506 are the same as those of the twelfth preferred embodiment. The difference is that the phase compensator and amplitude modulator of the thirteenth preferred embodiment now has 4 electrodes, consisting of the first conducting electrode 434, the second electrode 436, the third electrode 438, and the fourth electrode 439. The first, the second, and the third conducting electrodes 434, 436, 438, are arranged on the +Z surface of the variable dispersion section 210 and in adequate spacing corresponding to the width of the U-shape nonlinear optical waveguide. The fourth conducting electrode 439 is fabricated on the −Z surface of the variable dispersion section 210. The voltage on the 3 electrodes, 434, 438, 436, steps down from one side to the other along the Y direction, whereas the voltage on the fourth electrode 439 is kept lowest. This electrode arrangement has the effect of pulling down the electric flux toward the waveguide depth direction as described in the eighth preferred embodiment.

Although the above embodiments are mostly illustrated by using a second-harmonic-generation example, the present invention, a high-efficiency multiple-pass nonlinear wavelength converter with an EO phase compensator and amplitude modulator, is applicable to other phase-sensitive nonlinear wavelength conversion processes such as the SFG, DFG, and OPG.

What is claimed is:

1. A multiple-pass nonlinear wavelength converter and amplitude modulator, comprising a phase-matched nonlinear optical element section and a variable dispersion section in a nonlinear crystal substrate, wherein said variable dispersion section is applied with a voltage and controls the phase matching condition via the electro-optical effect.

2. The wavelength converter and amplitude modulator according to claim 1, wherein said phase-matched nonlinear optical element section is applicable for second-order nonlinear frequency conversion processes of second harmonic generation, sum frequency generation, difference frequency generation, and optical parametric generation.

3. The wavelength converter and amplitude modulator according to claim 1, wherein said variable dispersion section has an optical path varying along the direction perpendicular to the propagation direction of the mixing wave.

4. The wavelength converter and amplitude modulator according to claim 1, wherein said crystal substrate has adequate reflectors providing total internal reflections or retro-reflections to the mixing waves in order to reflect said mixing waves along an optical path at least two times longer than otherwise a single-pass path in said phase-matched nonlinear element section.

5. The wavelength converter and amplitude modulator according to claim 1, wherein said variable dispersion section has a plurality of conducting electrodes applied with one of a DC voltage and an AC voltage.

6. The wavelength converter and amplitude modulator according to claim 5, wherein said DC voltage and said AC voltage are to tune the multiple-pass nonlinear phase matching condition and thereby the output amplitudes of the mixing waves via the electro-optic effect.

7. A multiple-pass nonlinear wavelength converter and amplitude modulator, comprising a phase-matched nonlinear optical waveguide, a variable dispersion section, and a high reflector in a nonlinear crystal substrate, wherein said variable dispersion section is applied with a voltage and controls the phase matching condition via the electro-optical effect.

8. The wavelength converter and amplitude modulator according to claim 7, wherein said phase-matched nonlinear optical waveguide is used for second-order nonlinear frequency conversion processes of second harmonic generation, sum frequency generation, difference frequency generation, and optical parametric generation.

9. The wavelength converter and amplitude modulator according to claim 7, wherein said phase-matched nonlinear optical waveguide is a QPM nonlinear optical waveguide.

10. The wavelength converter and amplitude modulator according to claim 7, wherein said high reflector is a high-reflection optical dielectric film coated on the single-pass downstream end of said waveguide for reflecting the forward mixing waves back into said phase-matched nonlinear optical waveguide to continue a double-pass nonlinear wavelength-conversion process.

11. The wavelength converter and amplitude modulator according to claim 7, wherein said high reflector is a high-reflection optical metal film coated on the single-pass downstream end of said waveguide for reflecting the forward mixing waves back into said phase-matched nonlinear optical waveguide to continue a double-pass nonlinear wavelength-conversion process.

12. The wavelength converter and amplitude modulator according to claim 7, wherein said variable dispersion section has a plurality of conducting electrodes applied with one of a DC voltage and a suitable AC voltage.

13. The wavelength converter and amplitude modulator according to claim 12, wherein said DC voltage and said AC voltage are to tune the multiple-pass nonlinear phase matching condition and thereby the output amplitudes of the mixing waves via the electro-optic effect.

14. The wavelength converter and amplitude modulator according to claim 12, wherein said variable dispersion section is covered with an adequate dielectric film with an adequate thickness as a buffered layer below said conducting electrodes to avoid optical loss in the electrodes.

15. The wavelength converter and amplitude modulator according to claim 7, wherein a dichroic beam splitter is set at the input end of said phase-matched nonlinear optical waveguide for transmitting a pump wave while separating the double-pass output waves from the backward pump wave.

16. The wavelength converter and amplitude modulator according to claim 7, wherein a directional coupler is built in parallel to said phase-matched nonlinear optical waveguide near the output end of the double-pass process for extracting the energy of the wavelength converted signals in the backward direction.

17. The wavelength converter and amplitude modulator according to claim 16, wherein said directional coupler has a pair of conducting electrodes functioning as a coupler modulation element for optimizing the coupling efficiency of said directional coupler via the EO effect.

18. The wavelength converter and amplitude modulator according to claim 17, wherein said phase-matched nonlinear optical waveguide and the directional coupler are covered with an adequate dielectric film with an adequate thickness below said conducting electrodes as a buffered layer to avoid optical loss in electrodes.

19. A high-efficiency multiple-pass nonlinear wavelength converter and amplitude modulator, comprising a U-shape nonlinear optical waveguide and a variable dispersion section in a nonlinear crystal substrate, wherein said variable dispersion section is applied with a voltage and controls the phase matching condition via the electro-optical effect.

20. The wavelength converter and amplitude modulator according to claim 19, wherein said U-shape nonlinear optical waveguide, consisting of two parallel phase-matched nonlinear optical waveguides and a curved optical waveguide, is built for guiding mixing waves and performing double-pass nonlinear wavelength conversion.

21. The wavelength converter and amplitude modulator according to claim 20, wherein said curved optical waveguide is fabricated on said variable dispersion section.

22. The wavelength converter and amplitude modulator according to claim 20, wherein said phase-matched nonlinear waveguides are used for second-order frequency conversion processes of second harmonic generation, sum frequency generation, difference frequency generation, and optical parametric generation.

23. The wavelength converter and amplitude modulator according to claim 20, wherein said phase-matched nonlinear optical waveguides are QPM optical waveguides.

24. The wavelength converter and amplitude modulator according to claim 20, wherein said variable dispersion section has a plurality of conducting electrodes applied with one of a DC voltage and an AC voltage.

25. The wavelength converter and amplitude modulator according to claim 24, wherein said DC voltage and said AC voltage are to tune the multiple-pass nonlinear phase matching condition and thereby the output amplitudes of the mixing waves via the electro-optic effect.

26. The wavelength converter and amplitude modulator according to claim 24, wherein said variable dispersion section is covered with an adequate dielectric film with an adequate thickness as a buffered layer below said conducting electrodes to avoid optical loss in the electrodes.

27. The wavelength converter and amplitude modulator according to claim 20, wherein a dichroic beam splitter is set at the output end of said U-shape nonlinear optical waveguide for separating the double-pass output waves from the backward pump wave.

28. The wavelength converter and amplitude modulator according to claim 20, wherein a directional coupler is built near the output end of the U-shape nonlinear optical waveguide for extracting the energy of the wavelength converted signals in the backward direction.

29. The wavelength converter and amplitude modulator according to claim 28, wherein said directional coupler has a pair of conducting electrodes functioning as a coupler modulation element for optimizing the coupling efficiency of said directional coupler via the EO effect.

30. The wavelength converter and amplitude modulator according to claim 29, wherein said nonlinear optical waveguide and the directional coupler are covered with an adequate dielectric film with an adequate thickness below said conducting electrodes as a buffered layer to avoid optical loss in the electrodes.

* * * * *